US008514697B2

(12) United States Patent
Cao et al.

(10) Patent No.: US 8,514,697 B2
(45) Date of Patent: *Aug. 20, 2013

(54) MOBILE BROADBAND PACKET SWITCHED TRAFFIC OPTIMIZATION

(75) Inventors: Yang Cao, Westford, MA (US); Michael Nicolazzo, Philadelphia, PA (US); William M. Turner, Higganum, CT (US); Talbot Hack, Ann Arbor, MI (US); Moshe Suberri, Voorhees, NJ (US)

(73) Assignee: Sycamore Networks, Inc., Chelmsford, MA (US)

(*) Notice: Subject to any disclaimer, the term of this patent is extended or adjusted under 35 U.S.C. 154(b) by 545 days.

This patent is subject to a terminal disclaimer.

(21) Appl. No.: 12/684,427

(22) Filed: Jan. 8, 2010

(65) Prior Publication Data
US 2011/0170477 A1 Jul. 14, 2011

(51) Int. Cl.
*G01G 31/08* (2006.01)
*H04J 3/16* (2006.01)
*H04W 4/00* (2009.01)

(52) U.S. Cl.
USPC .......................... 370/225; 370/329; 370/465

(58) Field of Classification Search
USPC ............ 379/213.01, 221.01, 21.03, 221.04; 726/23, 22, 25, 13, 11, 12; 370/352, 401, 370/395.21, 328, 329, 335; 709/203, 209, 709/220–225; 455/445, 450, 452, 560
See application file for complete search history.

(56) References Cited

U.S. PATENT DOCUMENTS

| 4,730,348 | A | 3/1988 | MacCrisken |
| 5,049,881 | A | 9/1991 | Gibson et al. |
| 5,721,830 | A | 2/1998 | Yeh et al. |
| 5,924,114 | A | 7/1999 | Maruyama et al. |
| 6,021,408 | A | 2/2000 | Ledain et al. |
| 6,108,666 | A | 8/2000 | Floratos et al. |
| 6,363,470 | B1 | 3/2002 | Laurenti et al. |
| 6,490,252 | B1 * | 12/2002 | Riggan et al. ......... 370/237 |

(Continued)

FOREIGN PATENT DOCUMENTS

| WO | 95/19662 A1 | 7/1995 |
| WO | 01/86988 A1 | 11/2001 |
| WO | 2007/123760 A2 | 11/2007 |
| WO | 2011/085312 A1 | 7/2011 |

OTHER PUBLICATIONS

Lte, "3rd Generation Partnership Project; Technical Specification Group Services and System Aspects; Local IP Access and Selected IP Traffic Offload; (Release 10)," 3GPP TR 23.829 V0.3.1 (Nov. 2009) Technical Report (2009).

(Continued)

*Primary Examiner* — Hahn N Nguyen
(74) *Attorney, Agent, or Firm* — Nelson Mullins Riley & Scarborough LLP

(57) ABSTRACT

A method in an electronic device and a system for use in a communication network including a core network and at least one access network are described. Intermediate service platforms in an access network process data bound from a base station towards a core network, and vice versa. A first data channel or stream is processed by the intermediate service platform. Exemplary embodiments bypass the intermediate service platform by intercepting a second data channel or stream bound for the intermediate service platform. The data in the second data channel or stream is processed and inserted into a data channel or stream downstream of the intermediate service platform.

15 Claims, 11 Drawing Sheets

(56) References Cited

U.S. PATENT DOCUMENTS

| | | | |
|---|---|---|---|
| 6,757,291 B1* | 6/2004 | Hu | 370/401 |
| 7,003,533 B2 | 2/2006 | Noguchi et al. | |
| 7,657,938 B2* | 2/2010 | Palmer et al. | 726/23 |
| 7,689,633 B1 | 3/2010 | Li et al. | |
| 7,733,247 B1 | 6/2010 | He et al. | |
| 7,742,406 B1* | 6/2010 | Muppala | 370/230 |
| 7,773,507 B1* | 8/2010 | Kasralikar et al. | 370/230 |
| 7,774,304 B2 | 8/2010 | Banzon et al. | |
| 7,885,988 B2 | 2/2011 | Bashyam et al. | |
| 7,926,108 B2* | 4/2011 | Rand et al. | 726/22 |
| 8,024,313 B2 | 9/2011 | Mousavi et al. | |
| 8,037,105 B2 | 10/2011 | Kegel et al. | |
| 8,219,508 B2 | 7/2012 | McMillen et al. | |
| 2003/0217166 A1 | 11/2003 | Dal Canto et al. | |
| 2005/0044422 A1 | 2/2005 | Cantrell et al. | |
| 2007/0124788 A1 | 5/2007 | Wittkoter | |
| 2008/0095175 A1 | 4/2008 | Grandhi et al. | |
| 2008/0162574 A1 | 7/2008 | Gilbert | |
| 2008/0242224 A1* | 10/2008 | Fratti et al. | 455/3.06 |
| 2009/0187673 A1 | 7/2009 | Ramjee et al. | |
| 2009/0217322 A1 | 8/2009 | Hindle | |
| 2009/0265777 A1* | 10/2009 | Scott | 726/11 |
| 2010/0027533 A1* | 2/2010 | Kant et al. | 370/355 |
| 2010/0034089 A1 | 2/2010 | Kovvali et al. | |
| 2010/0318505 A1 | 12/2010 | Fisher et al. | |
| 2011/0134830 A1* | 6/2011 | Lin | 370/328 |
| 2011/0170429 A1* | 7/2011 | Cao et al. | 370/252 |

OTHER PUBLICATIONS

Stoke Inc., "Stoke Mobile Data Offload Solution Brief," retrieved online at: http://www.stoke.com/Solutions/smdo.asp (2009).

International Search Report for Application No. PCT/US2011/020683, dated Mar. 21, 2011.

Bentley, Jon et al., "Data Compression Using Long Common Strings," Proceedings of the Data Compression Conference DCC '99, pp. 287-295 (1999).

International Search Report and Written Opinion for Application No. PCT/US2011/024198, dated May 17, 2011.

International Search Report and Written Opinion for Application No. PCT/US2011/024206, dated May 13, 2011.

International Preliminary Report on Patentability for Application No. PCT/US2011/024206, 10 pages, dated May 2, 2012.

International Preliminary Report on Patentability for Application No. PCT/US2011/024198, 11 pages, dated Jun. 21, 2012.

International Preliminary Report on Patentability for Application No. PCT/US2011/020683, pp. 1-12, dated Apr. 3, 2012.

International Preliminary Report on Patentability for Application No. PCT/US2011/020683, 11 pages, dated Apr. 3, 2012.

Written Opinion for Application No. PCT/US2011/024198, 7 pages, dated Apr. 10, 2012.

Written Opinion for Application No. PCT/US2011/024206, pp. 1-9, dated Mar. 6, 2012.

* cited by examiner

MOBILE BROADBAND PACKET SWITCHED TRAFFIC OPTIMIZATION

BACKGROUND

A communication network typically includes a core network and at least one access network. The core network is the central part of the communication network and serves as the backbone of the communication network. The core network generally includes high capacity switches and transmission equipment.

Each access network serves as a point of contact with the communication network for users. An access network connects subscribers with service providers. A communication network may have multiple access networks, serving different sets of users, in communication with a single core network.

Typically, a user device requests a certain piece of content, such as a web page or a file, from the network. The content may be located on an electronic device, such as a file server, which may be located in the local access network, the core network, or a different access network. The request for content is typically forwarded through the access network to the core network. Within the access network, a number of devices may facilitate the forwarding or delivery of requests and information from a user to the core network. A user typically interacts with an access network through a base station that receives information and requests from the user device. The base station forwards information and requests through the access network towards the core network. The base station typically routes data through an intermediate service platform, such as a network controller or switch, on the way to the core network. The intermediate service platform may forward the request to a gateway. The gateway connects the access network to the core network.

A core services platform is located within the core network. The core services platform is a device that performs a variety of services. For example, the core services platform may identify a location where requested content is stored. The core services platform coordinates the retrieval of the requested content and the delivery of the requested content to the user device.

The content is sent back through the access network through the gateway to the intermediate service platform and the base station, which provides the content to the user device.

As more users connect to an access network and as more content is requested, the user experience and the speed of content delivery in the network are degraded. The existing devices in the access network are unable to efficiently handle the greater amounts of traffic. This problem is compounded because more complex content, such as multimedia content, is also being provided from the core network. Upgrading the devices in the access network may be costly. It may also be difficult and expensive to reprogram, upgrade, and/or expand the devices in the access network to accommodate additional devices which may help to relieve the strain on the existing devices.

SUMMARY

In light of the above, what is needed is a system and method for providing faster, more efficient service in an access network, without the need to upgrade existing devices and, preferably, without the need to make changes to existing devices.

The present application describes methods and devices for bypassing intermediate service platforms in an access network of a communication network while still leveraging the existing capabilities of the intermediate service platforms. A bypass device may be located in the access network. The bypass device may receive data traffic bound from the core network to the access network and separate the data traffic based on the type of data received. For example, the bypass device may separate the data into a first set of data to be handled by the bypassed intermediate service platform and a second set of data to be handled by the bypass device.

The bypass device may process the second set of data while the bypassed intermediate device may process the first set of data. The bypass device may also monitor control traffic that specifies how the data should be processed or handled, and may use the information in the control traffic to facilitate the processing of the second set of data. The bypass device may also perform other control functions that facilitate the separation of data sets, and may provide additional functionality specific to the second set of data.

The bypass device may forward the processed second set of data to a device downstream of the bypassed intermediate service platform. A remote node may be provided downstream of the bypassed intermediate service platform to further process the second set of data and recombine the second set of data with the first set of data. The remote node may forward the combined data sets towards a base station.

According to one embodiment, a method is performed in an electronic device. The method provides content to a user device in a communication network. The communication network includes an access network and a core network. An intermediate service platform is provided in the access network, and a bypass device bypasses the intermediate service platform while allowing the intermediate service platform to process a first set of data.

Further, an electronic device is provided for bypassing an intermediate service platform. The electronic device includes storage for storing instructions for performing a method for bypassing the intermediate service platform, and a processor for executing instructions.

According to other embodiments, an electronic device readable storage medium storing executable instructions for bypassing an intermediate service platform is also provided.

DETAILED DESCRIPTION

Figure 1A:
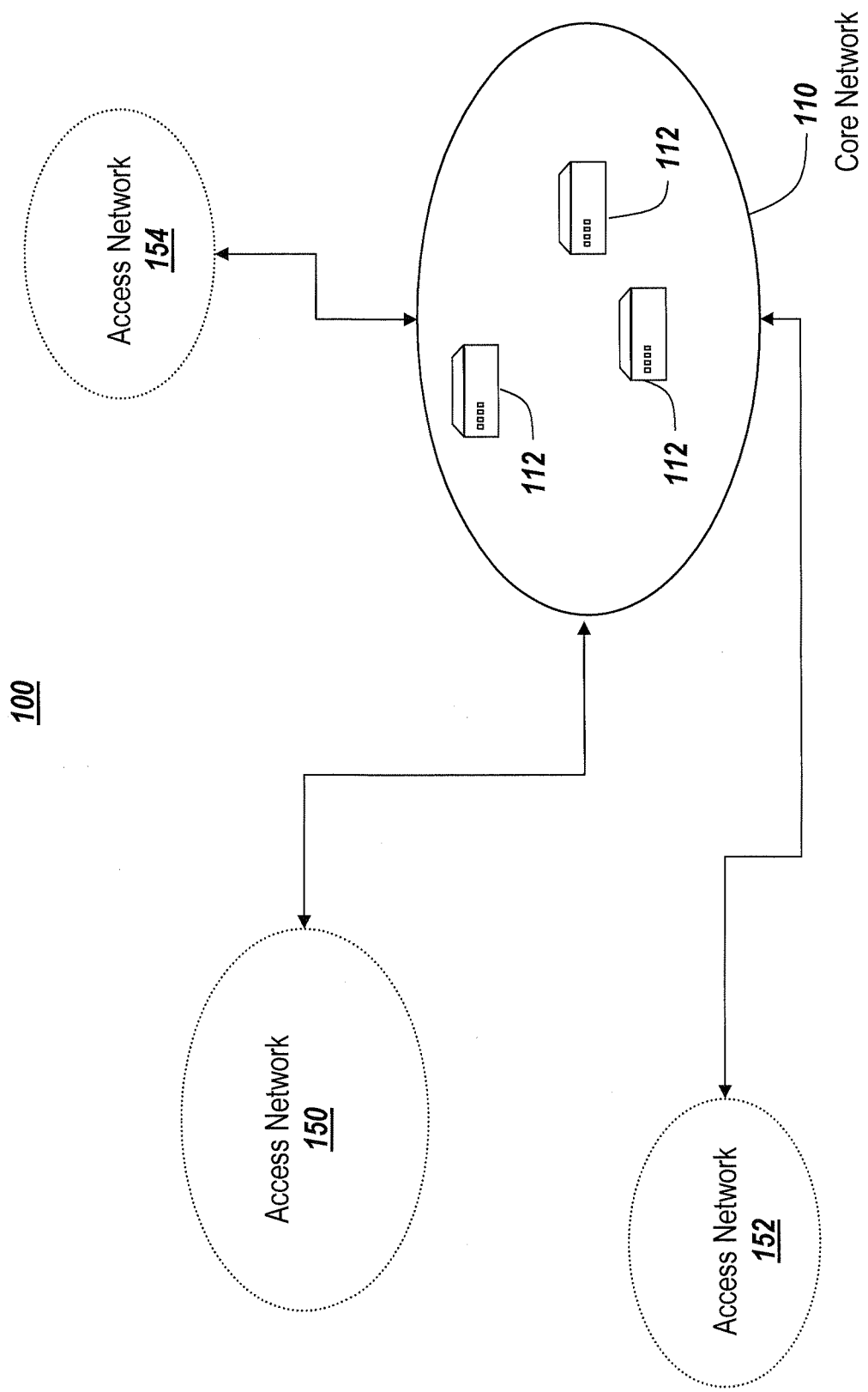
FIG. 1A depicts a communication network suitable for use in exemplary embodiments.

According to exemplary embodiments of the present invention, a bypass device is provided for bypassing one or more intermediate service platforms in an access network. The access network may provide one or more sets of data. For example, a telecommunications network might provide users with voice and data services. The voice services may involve, for example, a first set of digitized voice data in a voice format, and the data services may involve, for example, a second set of simple data in a simple data format and a third set of multimedia data in a multimedia data format. The bypass device may receive data at a location between a gateway and the bypassed intermediate service platform. For example, the bypass device may receive the digitized voice data, the simple data and the multimedia data. The bypass device may process and handle one type of data (e.g., the multimedia data) while passing other types of data (e.g., the voice data and the simple data) to the intermediate service platform. The bypass device may identify the type of data based on an identification of the data format (e.g., the voice format, simple data format, and multimedia data format), or based on other factors such as identifying headers, flags, or the use of a particular data channel, as described in more detail below. Once the bypass device processes or handles the second set of data, the bypass device may forward the second set of data towards the base station for delivery to a user.

The bypass device may process and handle the second set of data so that the intermediate service device is not burdened. Using the exemplary methods and devices described herein, a network provider may add functionality to an access network without performing expensive upgrades to intermediate service platforms or base stations. Accordingly, the network provider can increase the bandwidth, throughput, speed, and efficiency of the network while leveraging the existing infrastructure. Using the exemplary embodiments described herein, a network administrator does not need to make changes to their existing intermediate service platforms or base stations.

Further, the bypass device may optimize the data traffic. For example, the bypass device may compress the second set of data, or may cipher the second set of data. In this way, further functionality can be added to the network without making changes to the existing network structures. If, for instance, a new compression algorithm is developed for multimedia data, a bypass device may be deployed to compress the multimedia data, thus improving the speed, bandwidth, and throughput of the access network without making expensive upgrades or reconfiguring network devices.

The bypass device may be deployed in combination with a remote node located downstream of the bypass device. By employing the remote node, the bypass device is not restricted to data formats and procedures that are compatible with other network devices. For example, if the bypass device is used to bypass an intermediate service platform and compress the second set of data, the use of a remote node allows the bypass device to use any desired compression algorithm. Without the use of a remote node, the bypass device may be limited to using a compression algorithm that is understood by the base station, since the bypass device forwards the second set of data downstream towards the base station. This may limit the bypass device to compression algorithms that existed at the time that the base station was deployed. A remote node, either located between the base station and the bypass device or collocated with the base station, can be deployed at the same time as the bypass device to decompress the second data set using more up-to-date decompression algorithms.

FIG. 1A depicts a communication network 100 suitable for use in exemplary embodiments. The communication network 100 may be a wireless network, or a wired network, or a combination or wireless and wired networks. The communication network 100 may be, for example, a Universal Mobile Telecommunications System (UMTS) network. For clarity, some exemplary embodiments are described herein with reference to a UMTS network. However, one skilled in the art will recognize that the functionality described herein is equally applicable in different types of communication networks, such as a network utilizing a WiFi framework, a WCDMA framework, a CDMA framework, a WiMax framework an LTE framework, or a UMB framework, among others.

The communication network may include a core network 110 and access networks 150, 152 and 154. Those skilled in the art will appreciate that the depiction of the communication network 100 in FIG. 1A is intended to be merely illustrative and not limiting. Other network configurations are possible in practicing the present invention. For example, the communication network may be fully distributed so as to have no core network, or may have more than one core network. The communication network may also have more or fewer access networks than the communication network 100 depicted in FIG. 1A. Some devices depicted in the communication network in the present figures may not be present in other communication networks, while other devices not depicted in the figures may be present.

The core network 110 may include one or more core services platforms 112. The core services platforms 112 may provide services within the core network, such as (but not limited to) fetching data from a storage repository or routing data throughout communications network 100. A core services platform 112 can take a number of forms, depending on the services to be provided. For example, core services platforms 112 may be servers within core network 110. Alternatively, a core services platform 112 may be a switch, a router, a server (such as a file server or a mail server), a network bridge, a network hub, or a repeater.

Each access network 150, 152 and 154 serves as a point of contact with the communication network 100 for users, and connects subscribers with service providers. Examples of access networks include, but are not limited to, the UMTS Terrestrial Radio Access Network (UTRAN), the GSM Radio Access Network (GRAN), and the GSM Edge Radio Access Network (GERAN).

Figure 1B:
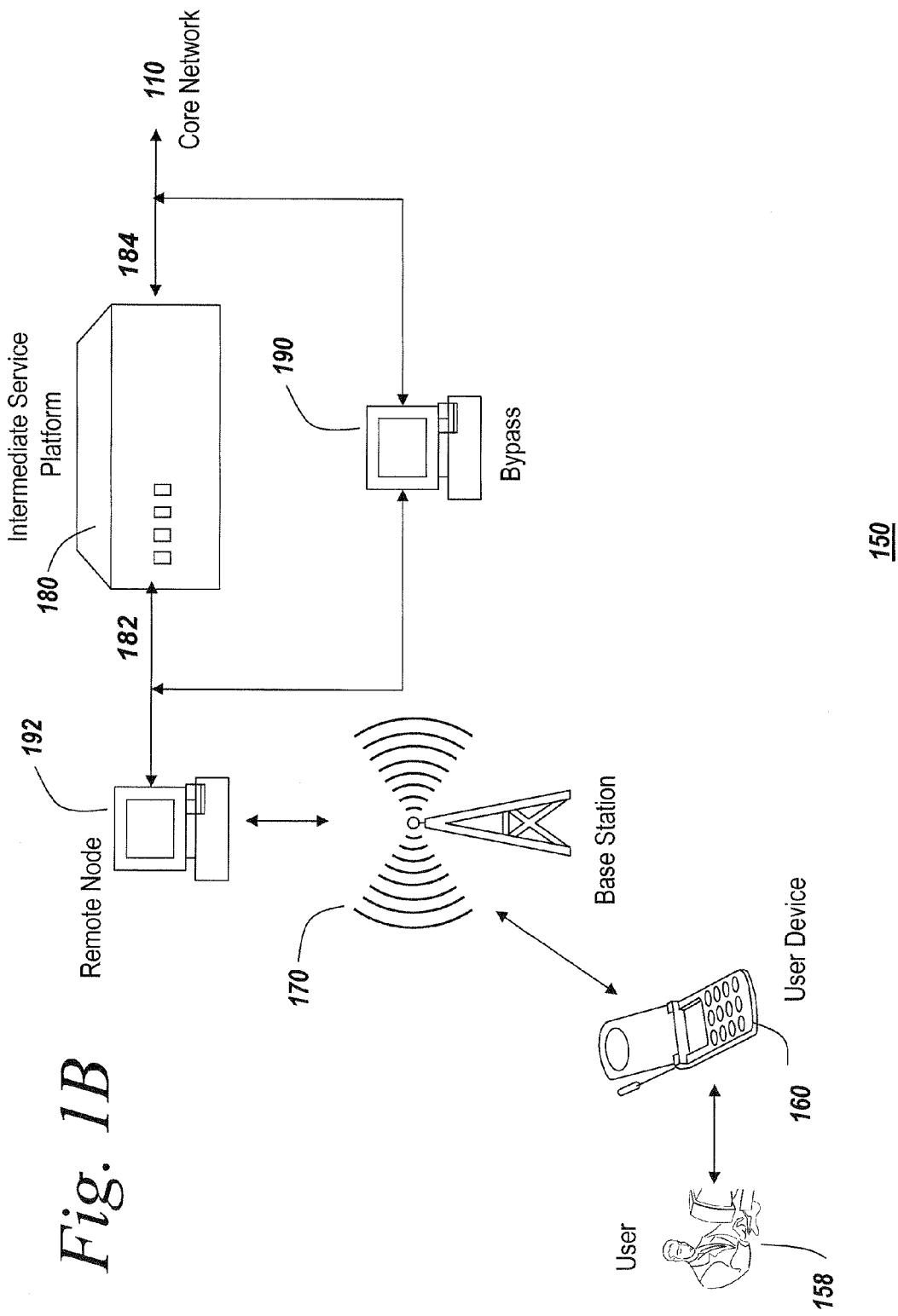
FIG. 1B depicts the mobile access network 150 of FIG. 1A in more detail.

FIG. 1B depicts exemplary access network 150 in more detail. A user 158 using a user device 160 may interact with the access network 150 via a communications device, such as a modem, fiber optic connection, or a transmitter and receiver for radio communication. The user device 160 may be, for example, but is not limited to, a computing device, a personal digital assistant, a cellular phone, or a Global Positioning System device. The user device 160 may send and receive data through a base station 170 located in the access network 150. The base station 170 may be, for example, a gateway, a cell tower, a Node B, or an Enhanced Node B.

Any of the devices in the network 100 may send or receive data. Data includes information sent from one device to another in any format, including analog data, digital data, or a combination of analog and digital data. The data may be transmitted in discrete data packets, or in a non-packetized format, such as a continuous series of bytes, characters, or bits.

Data may be sent through the access network using one or more data channels. A data channel, sometimes referred to as a data carrier, is a transmission medium that carries data from one point to another. Data channels include discrete logical fixed channels configured in a network. A data channel may be physical and tangible, such as a wire or fiber optic link, or may be intangible, such as a radio wave at a particular frequency or a wavelength of light. Data channels also include virtual or logical channels, such as software ports in a computer.

Data within a data channel may travel through the communication network on one or more data streams. A data stream, sometimes referred to as a data flow, is a sequence of coherent signals used to transmit or receive information that is in transmission. Data streams include information carried in a data channel. As used herein, "downstream" in an access network refers to a direction of data flow in a data stream towards a base station in the access network (or, if present, towards a user device). As used herein, "upstream" in an access network refers to a direction of data flow towards the core network. Unless otherwise noted, procedures described herein as being performed on data traveling in one direction may also be employed on data traveling in the other direction.

Instead of employing multiple data channels, a single data stream may include data transmitted in first and second formats. The data stream may be provided over a single transmission medium, or multiple transmission media. For example, each channel may be provided on a different transmission media.

As used herein, the term data channel includes any way of differentiating one set of data from another set of data. A data channel may include, but is not limited to, a physical data channel such as a wire, an intangible data channel such as a radio wave, data in a particular format, or data having particular characteristics that differentiate the data from other data.

One or more data channels in the access network 150 may originate, for example, at the user device 160 or the base station 170. A data stream in the data channel may be directed from the base station 170 towards the core network 110. The base station 170 may interact with one or more intermediate service platforms 180 located in the access network 150 or may interact directly with the core network 110.

The intermediate service platforms 180 may perform tasks such as resource management (directing control of the network in a manner that allows the efficient use of network resources), filtering (inspecting incoming and outgoing data in order to remove extraneous, harmful, or harassing data), and routing (directing network traffic towards its appropriate destination and providing user mobility management). Examples of intermediate service platforms 180 include, but are not limited to, Radio Network Controllers, bridges, routers, and Virtual Private Network (VPN) servers.

One or more data channels may pass through the intermediate service platform 180, each data channel carrying one or more streams of data. A bypass device 190 allows one or more of the data channels to bypass the intermediate service platform 180. The bypass device 190 may be, for example, a server, a router, a switch, a computer system, or a custom-designed device. The bypass device may be deployed in combination with a remote node 192 that facilitates or enables certain functionality provided by the bypass device 190.

Data channels or data streams in a network may be governed by one or more interfaces. An interface in the context of a data stream refers to a set of protocols or technical characteristics that describe the connection between two entities and/or govern the transmission of data in the data stream. Each of the data streams provided between two devices in a network may be governed by different interfaces. For example, in a UMTS network, the data stream between the intermediate service platform 180 (a Radio Network Controller, or RNC, in one example) and a gateway device located before the core network 110 may be governed by the IuPS interface, and the data stream downstream of the intermediate service platform 180 may be governed by the IuB interface (although the IuB interface includes both upstream and downstream traffic). Other examples of interfaces in the UMTS framework include the IuR interface, for signaling between two different RNCs. One of ordinary skill in the art will recognize that the above interfaces are provided merely as examples, and that the present invention may be applied to networks using any types of interfaces.

In exemplary embodiments, the bypass device 190 receives data on one or more interfaces, and sends data onto one or more interfaces. For example, if the bypass device 190 receives data on the interface 184 which is upstream of the intermediate service platform 180, the bypass device 190 may extract packet data from the upstream interface 184, and inject some or all of the data back onto the upstream interface 184. The bypass device 190 may also inject data onto another interface that the bypass device 190 is capable of reaching (e.g., the interface 182 that is downstream of the intermediate service platform 180). In this way, the bypass device 190 may bypass the intermediate service platform 180.

The user device 160 may send a request for data content to the network, and in doing so, may cause the base station 170 to start signaling the intermediate service platform 180 using an interface 182. Similarly, the core network may forward data to the access network, which may cause a device, such as a gateway device between the access network and the core network, to begin signaling the intermediate service platform 180 using an interface 184.

The bypass device 190 may monitor this signaling on interface 182 and interface 184 to identify an active data session, for example, an active data session initiated on behalf of the intermediate service platform 180, on behalf of a user device 160, or on behalf of one or more devices in the core network 110 or the access network 150. In order to monitor the signaling, the bypass device 190 may intercept, monitor, or receive data or traffic on the interface 182 and/or the interface 184. For example, the bypass device 190 may be include an input at a location in the data stream such that the data stream must pass through the input of the bypass device 190 before the data stream passes through the intermediate service platform 180. The bypass device 190 may also include an output such that data can be inserted into the data stream. The output may be located on the opposite side of the intermediate service platform 180 than the input. The bypass device 190 may monitor the traffic for an indication that a data session is being initiated, terminated, modified or moved, has already been initiated, terminated, modified or moved, or is about to be initiated, terminated, modified or moved.

The bypass device 190 may also be located at a location such that the data stream passes through both the intermediate service platform 180 and the bypass device 190. The bypass device 190 can monitor and/or intercept the traffic that passes through both interfaces 182, 184.

Once an active data session is identified, the bypass device 190 may take over the processing and handling of data in the data session. For example, the bypass device 190 may terminate and/or emulate the protocol layers involved in the active data session. The bypass device 190 may send out acknowledgements or network commands based on the data received at the bypass device 190. In exemplary embodiments where the bypass device 190 is employed in an existing network structure without making changes to the existing network devices, the bypass device 190 may emulate the existing network devices to make it appear that the network traffic is being routed to the destination intended by the other network devices. For example, if the core network 110 directs data to the intermediate service platform 180, and the bypass device 190 receives the data before the intermediate service platform 180, the bypass device may emulate the intermediate service platform 180 by sending acknowledgements and other protocol messages to the core network 110, possibly using an identifier associated with the intermediate service platform 180. The bypass device 190 may communicate that the data has been received by the intermediate service platform 180 so that the core network believes that the data has been handled appropriately. In the downstream direction, the bypass device 190 may emulate the intermediate service platform 180 towards the base station 170, for example by sending appropriate messages to the base station 170 using identifiers associated with the intermediate service platform 180.

Figure 2:
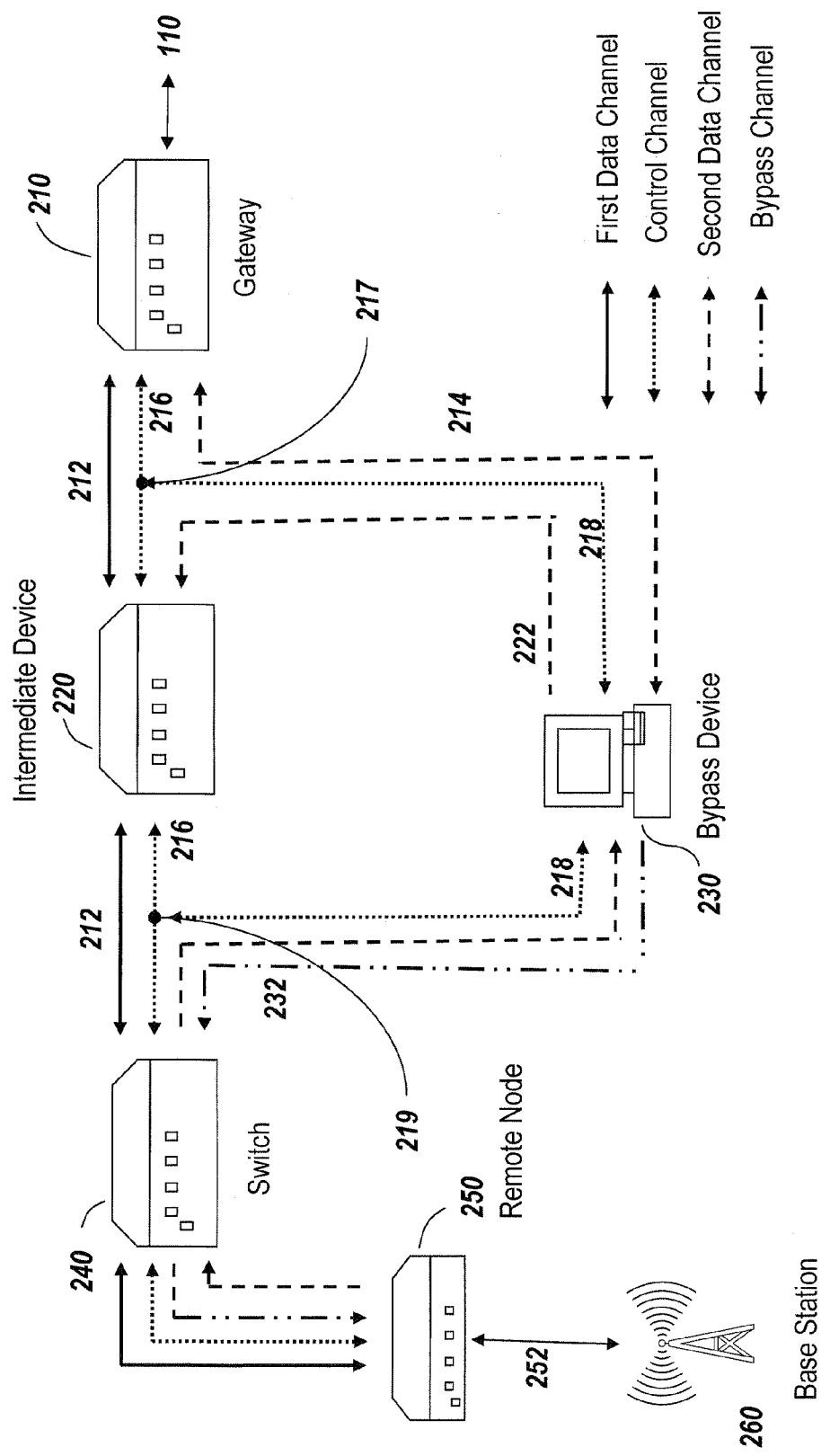
FIG. 2 depicts an exemplary data flow in a mobile access network according to exemplary embodiments.

FIG. 2 depicts an exemplary data flow in an access network 200 according to exemplary embodiments. FIG. 2 depicts data traveling through the access network 200 using a data stream having four different channels: a first data channel, a second data channel, a control channel, and a bypass channel. Although exemplary embodiments are described in terms of "data channels" and "data streams," one of ordinary skill in the art will recognize that the present invention is not so limited. Where "data channels" are referred to herein, data streams or other organizational systems may be employed, and vice versa.

Data originating in the core network 110 may first pass through a gateway 210 into the access network 200. The gateway 210 serves as the point of contact between the access network 200 and the core network 110. The gateway 210 sends and receives data on a data stream combining, for example, three data channels 212, 214, 216. The gateway 210 may be, for example, a switch, a router, a computer, or a custom-designed device. The gateway 210 may provide, for example, routing functionality, firewall functionality, filtering functionality, data collection, and/or billing functionality for a service provider. The gateway 210 may be, for example, a Gateway GPRS Support Node (GGSN), which serves an edge routing function for the access network.

In some embodiments, the first data channel 212 carries legacy data that can be efficiently or quickly processed by the intermediate service platform 220, while a second data channel 214 carries data that can be processed more efficiently or quickly by the bypass device 230. Data may be processed "more quickly" in that it takes less time to process the data by a quicker device. Data may be processed "more efficiently" in that it takes fewer resources (such as processing power or memory) to process the data by a more efficient device.

In some embodiments, the intermediate service platform 220 is not capable of processing data in the second data channel 214 because the intermediate device does not include hardware or software necessary to process data in the second data channel 214. In other embodiments, the intermediate service platform 220 is capable of processing data in the second data channel 214, but the intermediate service platform 220 has limited hardware of software capabilities that make it desirable to bypass the intermediate service platform 220.

In some embodiments, the data channels 212, 214 each carry data that could be handled quickly and efficiently by the intermediate service platform 220, but in order to relieve some of burden of processing or handling the data from the intermediate service platform 220, one or more of the data channels 212, 214 is diverted to the bypass device 230.

In some embodiments, the first data channel 212 is not provided, so that data is carried only a single data channel. Accordingly, the intermediate service platform 220 may be bypassed entirely for purposes of data processing.

Although some of the examples presented herein are described in terms of legacy data and non-legacy data, the present invention is not limited to these types of data. The first data channel 212 and second data channel 214 may carry any type of information in any data format.

The present invention is not limited to processing or handling exactly two data channels. In some embodiments, the intermediate service platform 220 processes more than one channel, and in some embodiments, the bypass device 230 processes more than one channel. Alternatively, the bypass device 230 may bypass the intermediate service platform 220 entirely such that all of the data channels of the data stream are routed through the bypass device 230 and not the intermediate service platform 220. The control channel 216 including instructions for handling the data stream may or may not be present.

If, for example, the communication network is a High Speed Packet Access (HSPA) network, the data stream may include a first data channel 212 carrying voice data and non-High Speed Downlink Packet Access (HSDPA) data, and a second data channel 214 carrying HSDPA data. The data stream may also include a control channel 216. In this example, the intermediate service platform 220 may be a Radio Network Controller (RNC) that manages a number of data channels. The RNC may be capable of handling the voice data, non-HSDPA data, and HSDPA data, but may, for example, suffer from limited throughput of the processing-intensive HSDPA data during peak periods of network usage. One of ordinary skill in the art will recognize that the present invention is not limited to an HSPA network, but may be employed in any type of communication network, including but not limited to a Core Division Multiple Access (CDMA) network and a WiMax network.

In a conventional network, the gateway 210 sends three data channels 212, 214, 216 directly to the intermediate service platform in a downstream direction. In contrast to the conventional network, exemplary embodiments described herein provide a bypass device 230 in the access network 200 for bypassing the intermediate service platform 220 with respect to one or more data channels in the data stream. In some embodiments, the bypass device 230 receives each of the data channels 212, 214, 216 in the data stream, and then selects which data to forward to the intermediate service platform 220 and which data to keep in the bypass device 230 for further processing. In the embodiment depicted in FIG. 2, the intermediate service platform 220 receives and processes the first data channel 212, while the second data channel 214 is intercepted by the bypass device 230. The bypass device 230 may intercept the downstream-traversing second data channel 214 bound from the gateway 210 towards the intermediate service platform 220, and may also intercept the upstream-traversing second data channel 222 bound from the intermediate service platform 220 towards the gateway 210.

For the purposes of this application, the bypass device is considered to be at the same location as the bypassed intermediate service platform in the data stream. The bypass device may receive or intercept data from the data stream, and insert or inject data into the data stream, either upstream or downstream of the intermediate service platform which the bypass device bypasses. The physical location of the bypass device may be the same as, or different than, the intermediate service platform.

In some embodiments, the bypass device 230 may intercept the second data channel 214 such that the second data channel 214 is not provided to the intermediate service platform 220. For example, the bypass device 230 may terminate one or more protocols or protocol layers associated with the second data channel 214 by receiving data in the second data channel 214 from the gateway 210, and emulating the intermediate service platform 220 to the gateway 210 by sending acknowledgements of receipt of the data and other protocol messages to the gateway 210. The same may be done in reverse (i.e., the bypass device 230 may receive data from the intermediate service platform 220 bound for the gateway 210 and emulate the gateway 210 by sending messages to the intermediate service platform 220). In this way, the second data channel 214 is not provided to the intermediate service platform, but it appears to the gateway 210 that the data has been appropriately received by the intermediate service platform 220. In this way, the second data channel 214 does not consume the resources of the intermediate service platform 220.

In addition to the first data channel 212 and the second data channel 214, a control channel 216 may be provided for instructing devices in the access network how to handle incoming and outgoing data packets, data channels, and/or data streams. The bypass device 230 may monitor 218 the control channel 216, for example at a point 217 between the gateway 210 and the intermediate service platform 220 in the data stream and at a point 219 between the intermediate service platform 220 and the base station 260.

The bypass device 230 may process the second data channel 214. For example, the bypass device 230 may perform compression and/or ciphering, as described in more detail with respect to FIG. 4 below. Once the second data channel 214 has been processed by the bypass device 230, the bypass device may create a bypass channel 232 in the data stream and forward processed data through the bypass channel 232 towards a remote node 250.

In exemplary embodiments, the bypass device 230 determines what fraction of data traffic flow bypasses the intermediate service platform 220. For example, the bypass device 230 may intercept and process all of the data in the second data channel 214, or may determine that only a portion of the data in the second data channel 214 should bypass the intermediate service platform 220. The bypass device 230 may be preprogrammed with this determination, or may determine a fraction of data traffic flow that bypasses the intermediate service platform 220 dynamically, based on either the status of the intermediate service platform 220 or the status of other devices or traffic flows in the network.

In some embodiments, the bypass device 230 bypasses only a portion of the data traffic flow. For example, the bypass device 230 may bypass a portion of the data traffic flow while relying on the intermediate service platform 220 to handle traffic related to power management, radio resource management, certain types of data, etc.

The bypass channel 232 may include data in a bypass format. The bypass format may or may not be compatible with the intermediate service platform 220 and/or the base station 260. The bypass format may be compressed and/or ciphered. The bypass format may be the same as the format for data in other channels in the network, such as channels 212, 214, 216, or may be different from the other formats.

A switch 240 may also be provided in the access network 200. The switch 240 may facilitate the interception of the second data channel traveling 214 upstream from the base station 260 towards the gateway 210.

A remote node 250 receives the data channels from the upstream direction of the data stream. The remote node 250 may be collocated with the base station 260 so that the remote node 250 is located in the same physical location as the base station 260, and may be provided integrally with the base station 260. In other embodiments, the remote node 250 is not located at the same physical location as the base station 260. Regardless of the physical location of the remote node 250, the remote node 250 may be located at a position in the data stream such that the data stream must pass through the remote node 250 on the way to the base station 260 or switch 240. In some embodiments, the remote node 250 is not provided.

The remote node 250 may repackage the data channels into a combined data channel 252 for transmission to the base station 260. The combined data channel 252 may include data having the same general organization as data entering the access network from the core network 110. For example, the combined data channel 252 may include one or more individual data channels or one or more individual data streams. In another example in an UMTS network, different data streams may be multiplexed onto an IuB interface. The remote node 250 may accept the bypass data channel 232 and process the bypass data channel 232 so that the data in the bypass data channel is returned to its original format. The original format may be a format that is compatible with the intermediate service platform 220 and/or the base station 260. In this way, exemplary embodiments can be implemented in existing networks without changing the intermediate service platform 220 or the base station 260. The remote node 250 may perform error checking, decompression, deciphering, and other functions, as described in more detail below with respect to FIG. 7.

As indicated by the bidirectional arrows in FIG. 2, the above procedure may also be applied in the reverse direction for data traveling upstream from the base station 260 towards the gateway 210.

Figure 3:
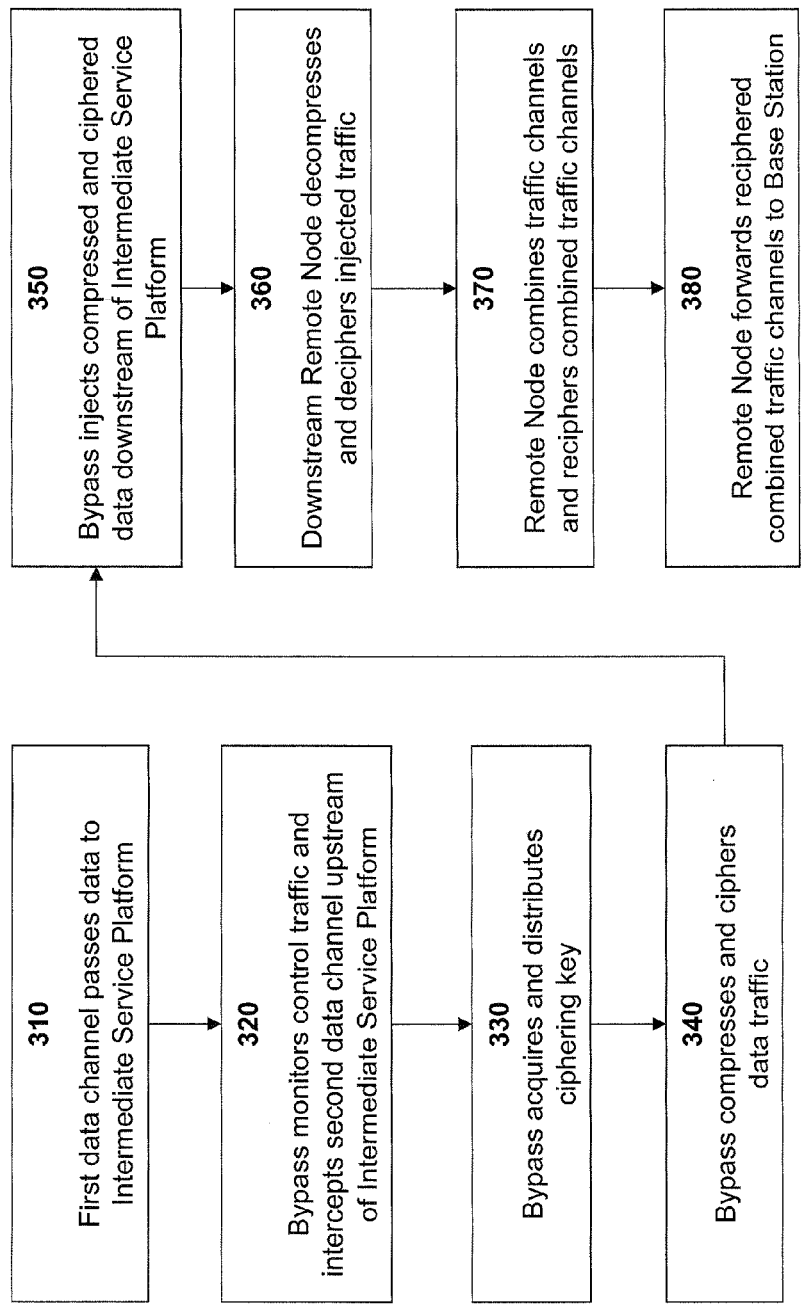
FIG. 3 is a flow chart depicting an exemplary procedure for bypassing an intermediate service platform in an access network.

FIG. 3 is a flow chart depicting an exemplary procedure for bypassing an intermediate service platform in an access network from the perspective of a data stream including three data channels traveling in a downstream direction from the core network towards a base station.

At step 310, a first data channel passes data to intermediate service platform. The first data channel may originate at the core network, or may originate at a gateway between the core network and the access network. The gateway may also be provided in the access network. The first data channel may include legacy data that may be efficiently processed by the intermediate service platform. In some embodiments, no first data channel is provided and the intermediate service platform is bypassed entirely.

The first data channel may be passed to the intermediate service platform in a number of ways. For example, the first data channel may first pass from the gateway through the bypass device, which may then forward the first data channel to the intermediate service platform. Alternatively, the first data channel may be provided to the intermediate service platform without first passing through the bypass device.

At step 320, a bypass device monitors control traffic in a control channel and intercepts a second data channel upstream of intermediate service platform. The bypass device may monitor multiple control channels. In some embodiments, the bypass device monitors control channels on the network's IuPS interface and control channels on the IuB interface. The control channel may include, for example, information provided according to the Radio Access Network Application Part (RANAP) protocol. The second data channel may include non-legacy data that cannot be efficiently processed by the intermediate service platform, or that cannot be processed by the intermediate service platform at all. Alternatively, the second data channel may simply carry different data than the first data channel. The bypass device may use information in the control channel to process or route data in the second data channel. The bypass device may terminate the second data channel between the gateway and the intermediate service platform such that the second data channel does not reach the intermediate service platform.

At step 330, the bypass device may acquire and distribute one or more ciphering keys. If the bypass device is used to cipher the data in the second data channel, the bypass device may provide the ciphering keys to a remote node located downstream from the bypass device in order to allow the remote node to decipher the data. The bypass device may acquire the ciphering keys, for example, using the RANAP protocol on the control channel.

At step 340, the bypass device may compresses and cipher the data traffic in the second data channel in order to form a bypass data channel carrying data in a bypass format. Ciphering is a procedure for encrypting information. Compression is a procedure that takes original data and encodes the data using fewer information units (for example, bits) than the original data. The use of compression may facilitate the optimization of data transmission in the network. It is to be understood that the term "optimization" includes elements that improve the speed or efficiency of data transmission in the network, or allow data transmission to be accomplished with fewer resources, although an "optimization" need not enable optimal or maximal data transmission. The bypass device may also perform other optimizations for data transmission in the network, such as error detection and prevention, filtering, bypassing one or more slower devices, adaptive or dynamic congestion control, dynamic policy enforcement that selectively invokes network policies based on traffic flows, distributed monitoring, and mobile analytics.

If compression is already employed in the access network outside of the bypass device, the compression algorithm employed at step 340 may be the same as or different than the compression otherwise employed in the access network. If ciphering is already used in the access network outside of the bypass device, the ciphering algorithm employed at step 340 may be the same as or different than the ciphering otherwise employed in the access network. The compression and ciphering algorithms may be selected based on one or more properties of the data in the second data channel. For example, some compression algorithms are better suited to HSDPA data, which may be carried in the second data channel, than non-HSDPA data, which may be carried in the first data channel. The bypass format of the bypass data channel may be the same as, or different than, the format used in the data stream between the gateway and the intermediate service platform or the format used in the data stream between the intermediate service platform and the base station. The bypass format may or may not be compatible with the intermediate service platform, and the bypass format may or may not be compatible with the base station.

At step 350, the bypass device injects the compressed and ciphered data into a data stream downstream of the intermediate service platform. In injected data may be in a bypass format and injected into a bypass data channel. The bypass device may direct the bypass data stream to a switch or a remote node, or to another intermediate device.

At step 360, a remote node downstream of the bypass device decompresses and deciphers injected traffic (this procedure may be performed in any order, so that the remote node may first decipher and then decompress incoming traffic). The remote node may use the encryption keys distributed at step 330. The remote node may also receive data channels provided by the intermediate service platform, such as the first data channel and/or the control channel. Further functionality of the remote node is described in detail in relation to FIG. 7.

At step 370, the remote node may combine received traffic channels and reciphers combined the traffic channels. For example, the remote node may receive the first data channel and the control channel from the intermediate service platform, and may receive the bypass data channel from the bypass device. The remote node may multiplex the signals and forward the multiplexed signal. When the remote node receives these data channels, the remote node may translate the bypass data channel back into a format that is compatible with the intermediate service platform and/or the base station. The remote node may repackage the received data channels into a single data stream and forward the data stream towards the base station at step 380.

Figure 6:
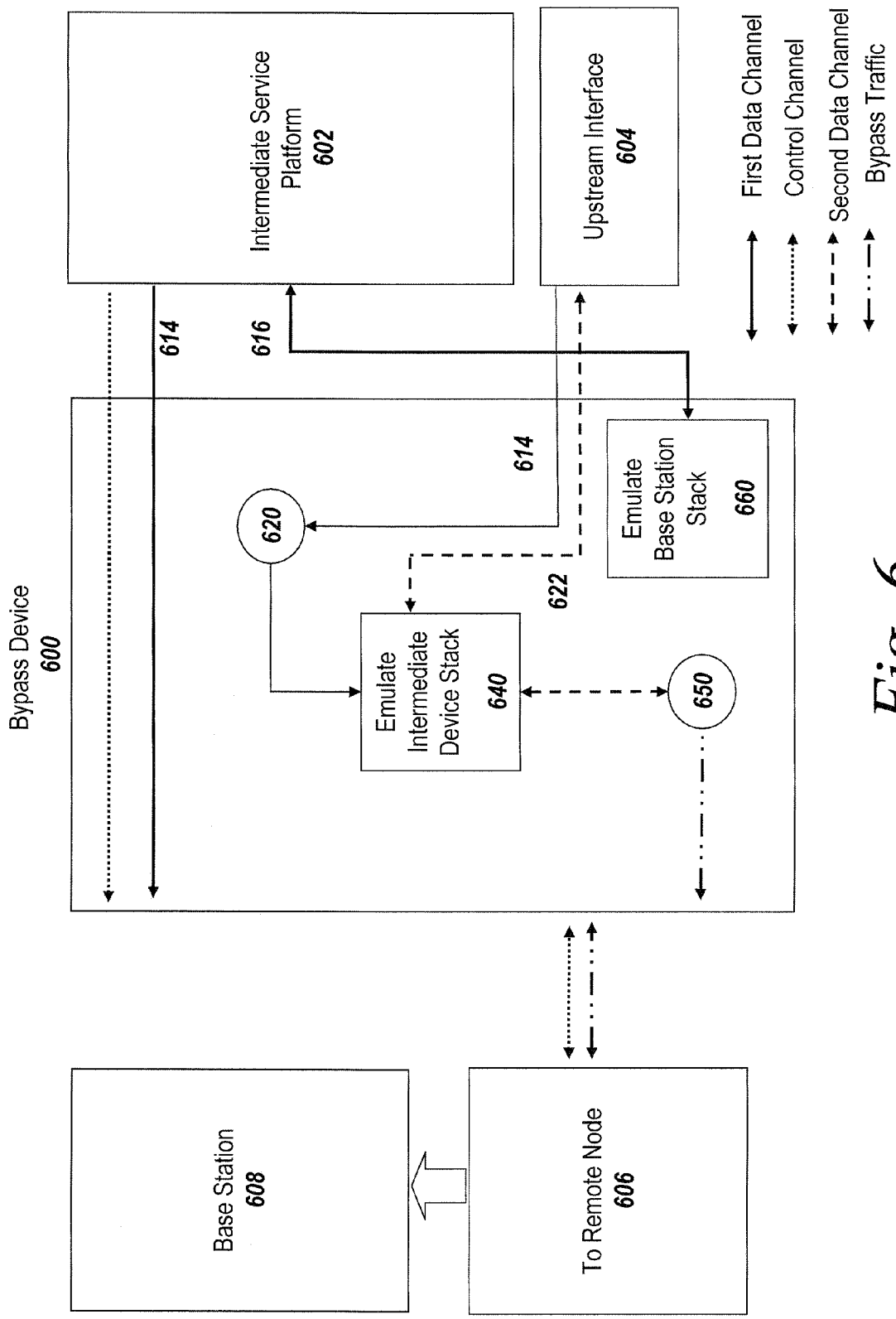
FIG. 6 graphically depicts the functions performed on a downstream side of a bypass device 600 according to exemplary embodiments
Figure 7:
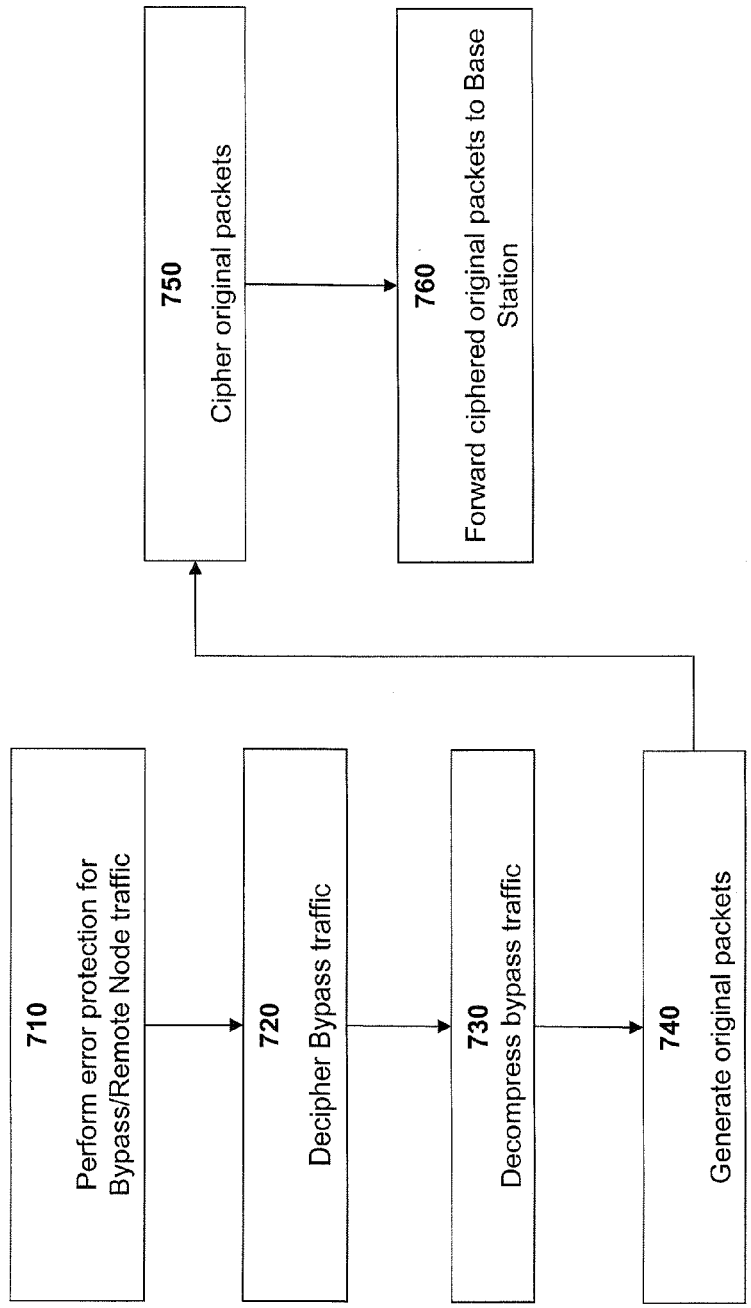
FIG. 7 is a flowchart depicting an exemplary procedure performed by a remote node receiving data from a bypass device according to exemplary embodiments.

The preceding description provides a high-level overview of the devices in the network and exemplary procedures performed in the access network as a whole. The bypass device and remote node are discussed individually in more detail below. Specifically, FIGS. 4-6 graphically depict the way that the bypass device interacts with the data stream and the other devices in the network. FIG. 7 depicts an exemplary procedure to be performed by a remote node operating in conjunction with the bypass device to optimize network traffic.

Figure 4:
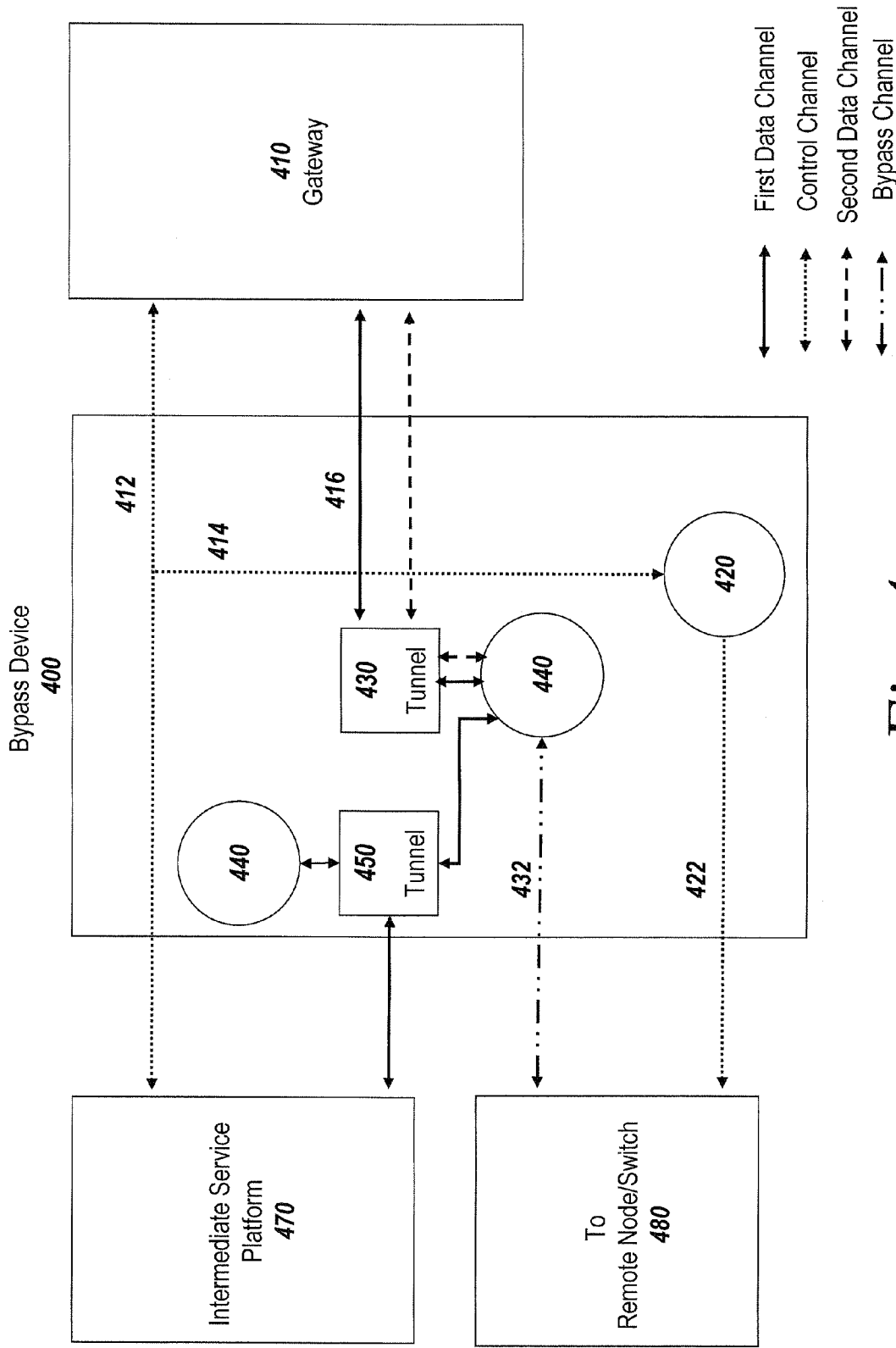
FIG. 4 graphically depicts the functions performed on an upstream side of a bypass device 400 according to exemplary embodiments

FIG. 4 graphically depicts the functions performed on an upstream side of a bypass device 400 according to exemplary embodiments. The bypass device 400 may monitor a control channel 412. For example, the control channel 412 may be a control channel employing the RANAP protocol, and the bypass device 400 may monitor 414 the control channel 412 in order to receive and distribute cipher keys 420 to other network devices.

The bypass device 400 may receive user traffic 416 including a first data channel and a second data channel bound from the gateway 410 towards the intermediate service platform 470. Alternatively, the bypass device 400 may intercept the second data channel while allowing the first data channel to pass directly to the intermediate service platform 470. The user traffic 416 may be received on an input of the bypass device 400 that is appropriate to the type of data channel carrying the user traffic 416. For example, if the user traffic 416 is carried on a particular radio frequency, the bypass 400 may receive the user traffic 416 using a radio receiver. Other types of inputs include, but are not limited to, fiber optic receivers, coaxial receivers, and ports for registered jacks.

In order to transmit traffic to other devices, the bypass device 400 may further include an output. The output of the bypass device 400 may be of a type that is capable of communicating on a particular data channel to be received by an input of a receiving device connected to the data channel. For example, if the data channel involves a radio channel, the output may be a radio transmitter. Other types of outputs include, but are not limited to, lasers for use in fiber optic networks, modulators, and ports for registered jacks. The input and output of the bypass device 400 may be the same component, or may be different components.

In order to send and receive data to and from the gateway 410 or the intermediate service platform 470, the bypass device 400 may employ a tunneling protocol 430, 450. A tunneling protocol is a network protocol wherein a delivery protocol encapsulates a payload protocol. Using tunneling, a payload can be delivered over an otherwise incompatible network protocol. For example, if the access network employs the General Packet Radio Service (GPRS) system, the bypass device 400 may emulate the GTP-U tunneling protocol over a tunnel 430 that connects the bypass device 400 to either the remote node (directly or indirectly) or the intermediate device 470.

If the user traffic 416 includes a first data stream for processing by the intermediate service platform 430, the bypass device 400 may include a selector 440 for differentiating between data traffic that is in the first data channel and data traffic that is in the second data channel. The selector 440 may be implemented in hardware or software. The selector 440 may differentiate between data traffic in the first data channel and data traffic in the second data channel based on any distinguishing characteristics of the data channel or the data itself. For example, if the first data channel is transmitted on a certain radio frequency and the second data channel is transmitted on a different radio frequency, the selector 440 may differentiate between the data channels based on frequency. If the first and second data channels involve data packets in different formats but are carried on the same radio frequency, the selector 440 may differentiate the data channels based on the format of the data packets. One of ordinary skill in the art will recognize that other ways of differentiating data are also possible, and that the above description is meant to be exemplary only.

The selector 440 forwards data traffic from the first data channel to the intermediate service platform 470, for example by employing a tunnel 450 to provide the first data stream to the intermediate service platform 470. The tunnel 450 may utilize the same tunneling protocol as the tunnel 430, or may employ a different tunneling protocol.

The selector 440 further forwards data traffic from the second data channel to other components of the bypass device 400 for optimization, or alternatively may transmit the data to other devices in the access network using a bypass data channel 432. The data in the bypass data channel may first be compressed and ciphered, as discussed in more detail below with respect to FIG. 6 depicting the downstream side of the bypass device 400.

While the bypass device 400 is routing data, the intermediate service platform 470 may be tasked with managing the active channels in the access network. The intermediate service platform 470 may instruct devices in the network to utilize common channels rather than specialized channels in order to conserve network resources. However, this may cause problems when the intermediate service platform 470 is bypassed, because although network traffic continues to be routed by the bypass device 400 (potentially relying on one or more specialized channels), the bypassed intermediate service platform 470 may be unaware of the presence of the specialized data and may therefore instruct the other devices in the network not to use the specialized channels.

Accordingly, a traffic generator 440 on the bypass device 400 may generate keep-alive traffic to be provided to the intermediate service platform 470 through the tunnel 450. The traffic generator 440 may be implemented in software or hardware. The traffic generator 440 generates enough specialized traffic so that the intermediate service platform 470 continues to keep one or more specialized channels open. The traffic generator 440 may be configured to generate a minimum amount of traffic for the intermediate service platform 470 such that the generated amount of traffic meets or only marginally exceeds the threshold at which the intermediate service platform 470 determines that a specialized channel is not idle and therefore maintains the specialized channel in an open configuration.

For example, the intermediate service platform 470 may be a network controller, which may switch between different network channels for a variety of purposes. For example, a radio network controller (RNC) may switch an HSDPA call from the HS-DSCH and DCH to the FACH/RACH common channels when the HSDPA channel is idle. This allows the RNC to conserve network resources during periods of inactivity. To determine whether the HSDPA channel is idle, the RNC maintains a system-configured inactivity timer known as the down-switch timer. The value of the down-switch timer, which may be expressed in seconds, represents an amount of time. If a certain amount of network traffic has not utilized the HSDPA channel in the amount of time represented by the down-switch timer, the RNC switches to the common channel. This minimum amount of network traffic required to keep the RNC on the HS-DSCH and DCH channels is known as the up-switch threshold, and it may be expressed in, for example, bytes.

Figure 5:
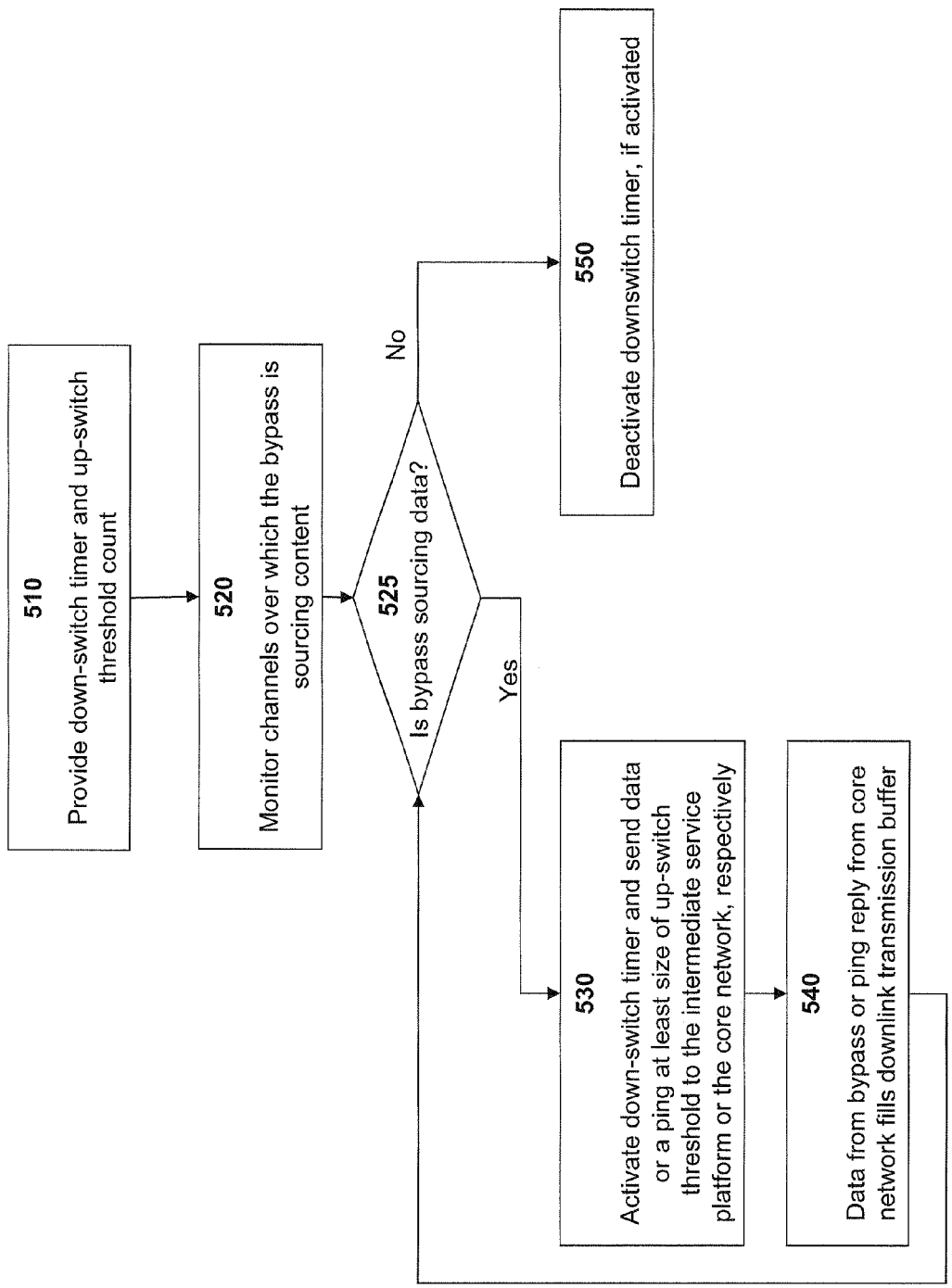
FIG. 5 is a flow chart depicting a procedure to prevent channel switching by an intermediate service platform managing a number of channels in a network during content sourcing.

In order to prevent channel switching by the intermediate service platform 470, it may be necessary to force the intermediate service platform 470 to remain on the currently active channel using a procedure similar to the one depicted in FIG. 5.

FIG. 5 depicts a procedure to prevent channel switching by an electronic device managing a number of channels in a network during local content sourcing. In the exemplary embodiment depicted in FIG. 5, the intermediate service platform may be a Radio Network Controller (RNC) and the bypass device may be an RNC Bypass. Although FIG. 5 is described with reference to an RNC and RNC Bypass, the method performed in FIG. 5 is not so limited, and can be readily employed with any intermediate service platform and bypass device.

The RNC maintains a down-switch timer and an up-switch threshold, as described above. At step 510 the RNC Bypass maintains a second down-switch timer with a value less than the network controller's down-switch timer. The RNC Bypass also maintains a second up-switch threshold with a value larger than the RNC's up-switch threshold.

At step 520, the RNC Bypass monitors the channels over which the RNC is sourcing data. If the RNC Bypass determines, at step 525, that the RNC is sourcing data, then the RNC Bypass activates the down-switch timer at step 530. Before the amount of time specified by the down-switch timer has elapsed, the RNC Bypass sends data of size at least equal to the up-switch threshold to the RNC.

Alternatively, the RNC Bypass may send a ping to the core network. A "ping" is a tool used in computer networks to test a number of parameters in the network. A ping may be, for example, a data packet from one device to another. A first device may send a ping, for example, an ICMP echo request packet, to a second device. The second device may respond with an ICMP echo response reply when it receives the initial ping. When the first device receives the ping reply, the first device may use the reply to calculate network parameters, such as the round-trip time from when the first ping was sent to when the reply ping was received. The first device may also use pings to measure the amount of data loss in a network, or to determine whether another device is reachable, or to determine what route a data stream will use through the network when communicating between two devices.

When the RNC Bypass sends a ping to the core network as described above, the core network sends a reply ping back to the access network in which the RNC Bypass is located. This ping reply passes through the RNC.

When the data or ping is received by the RNC, because the down-switch timer maintained by the RNC Bypass is less than the down-switch timer maintained by the RNC, the data or ping reply arrives at the RNC before RNC's down-switch timer has elapsed. Further, because the up-switch threshold maintained by the RNC Bypass is greater than the up-switch threshold maintained by the RNC, the data or ping reply exceeds RNC's up-switch threshold. This causes the data or ping reply to fill the RNC's downlink transmission buffer at step 550, which causes the RNC to remain on the active channel.

On the other hand, if the RNC Bypass is not actively sourcing data (step 525), then the RNC deactivates the down-switch timer at step 550. This allows the RNC to revert to the common channel when the active channel is actually idle, conserving network resources.

FIG. 6 graphically depicts the functions performed on a downstream side of a bypass device 600 that bypasses an intermediate device 602 according to exemplary embodiments.

In order to send and receive data to and from the devices in the network, the bypass device 600 may emulate a protocol stack or a portion of a protocol stack used by other devices in the network. For example, if the intermediate service platform 602 performs functions at layers 2 and 3 of the OSI model, the emulated protocol stack 640 may perform the L2 and L3 functions of the intermediate service platform 602. Alternatively, the emulated protocol stack may involve only L2 functions. Accordingly, the emulated protocol stack may include the entire protocol stack of another device in the network, or only the portions of the protocol stack that are needed to allow the emulating device to process data in the network More specifically, if the bypass device emulates some or all of the protocol stack 640 of the intermediate service platform 602, where the intermediate service platform 602 is an RNC, the emulated stack may involve emulating various radio protocols, including the Radio Link Control (RLC) protocol, the Medium Access Control (MAC) protocol, and manage the FP transmissions between the base station 608 and the intermediate service platform 602.

By emulating a device in the network, the bypass device 600 appears to be the emulated device to other devices in the network. Accordingly, the bypass device 600 can communicate with devices in the network without having to reconfigure the other devices.

The second data channel 622 may be intercepted by the bypass device 600 emulating the protocol stack 640 utilized by the intermediate service platform 602. Similarly, the bypass device 600 may emulate the protocol stack 660 of the base station 608 in order to send and receive data in the first data channel. The emulated protocol stack 660 may allow the bypass device 600 to emulate a flow control mechanism of the base station 608.

The bypass device 600 may extract ciphering keys 614 from the upstream interface 604, as described above. The ciphering keys 614 may be used by a ciphering tool 620 to decipher any ciphered data in the data stream, and to cipher any outgoing data.

The bypass device 600 may also include a compressor 650 for compressing data received from the second data stream. The compressor 650 may be implemented in hardware or software. The compressor may utilize any appropriate compression algorithm, and may select a compression algorithm based on the type of data present in the second data stream. The bypass device 600 may also perform other maintenance functions, such as discarding keep-alive messages as necessary, adjusting traffic information to account for the bypassed data traffic, and providing error-protection for data sent out on the bypass channel.

FIG. 7 is a flowchart depicting an exemplary procedure performed by a remote node receiving data from a bypass device according to exemplary embodiments.

At step 710, the remote node performs error checking and error protection for the traffic traveling between the bypass device and the remote node. The error checking and error protection may be done using any suitable error-checking procedure, such as by using a checksum.

At step 720, the remote node deciphers traffic coming from the bypass device. The remote node may use cipher keys provided by the bypass device to decipher the traffic coming from the bypass device. At step 730, the remote node decompresses the traffic coming from the bypass device. The remote node may use any decompression algorithm suitable for use with the compression algorithm used by the bypass device. Steps 720 and 730 may be reversed, as necessary.

At step 740, the remote node regenerates the original packets provided by the gateway or the core network. Step 740 may involve translated traffic received at the remote node into a format compatible with the intermediate service platform and/or the base station.

At step 750, the original packets regenerated at step 740 are ciphered in a way that will be understandable by the base station. Optionally at step 750, the regenerated packets may be compressed. At step 760, the ciphered original packets are forwarded from the remote node to the base station.

Figure 8:
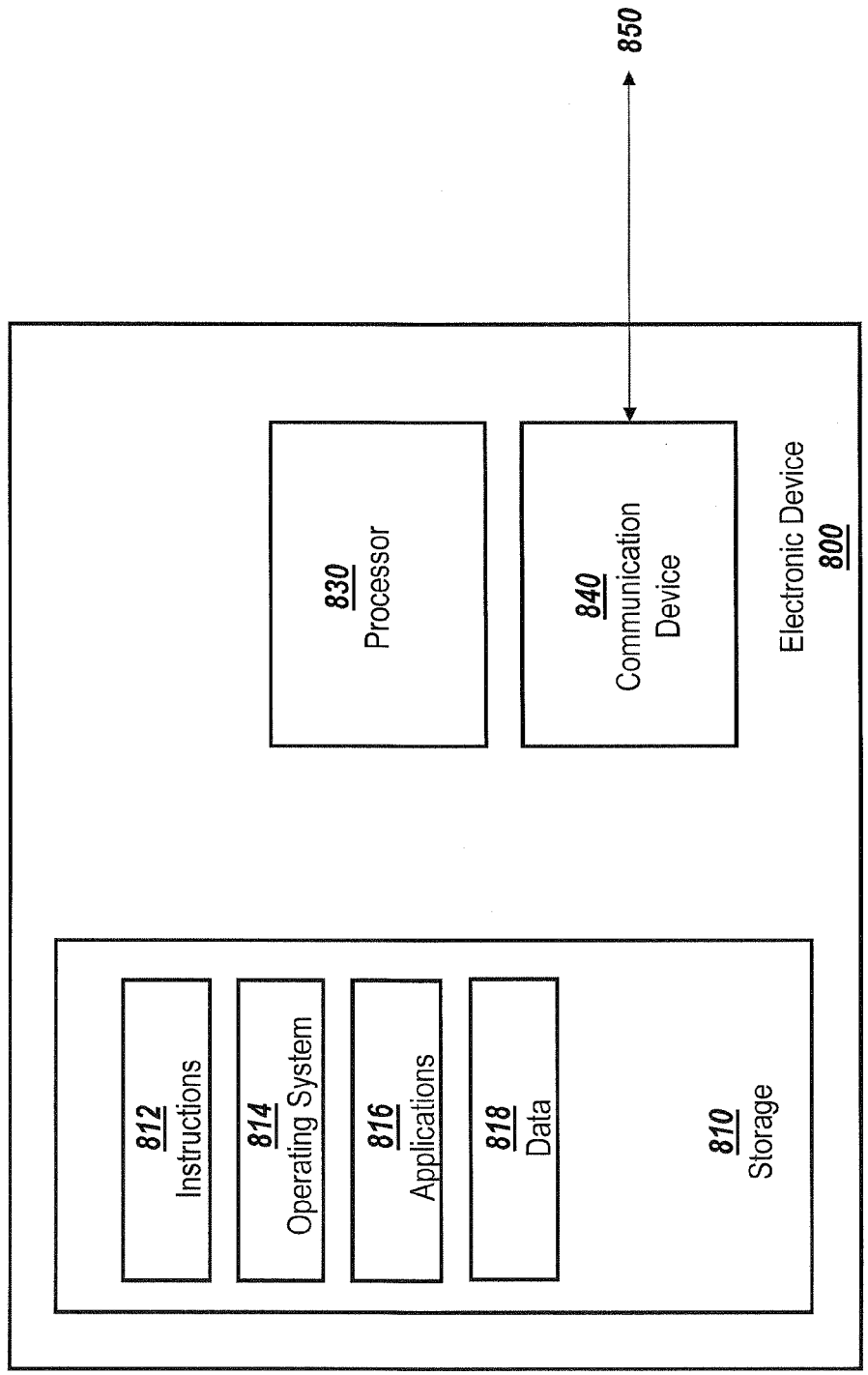
FIG. 8 depicts an electronic device 800 suitable for use in exemplary embodiments.

FIG. 8 depicts an electronic device 800 suitable for use in exemplary embodiments. The electronic device 800 may contain a storage 810 for storing instructions 812 to be executed by one or more processors 820, such as a microprocessor, ASIC, FPGA, or a controller. The instructions 812 may be stored on one or more electronic device readable storage media. Examples of electronic device-readable storage media include, but are not limited to, RAM, ROM, magnetic storage media, or optical storage media, such as CDs or DVDs. Instructions 812 may cause the processor 820 to perform a series of steps described in detail herein. The instructions 812 may be in any form that describes how to perform these steps. For example, the instructions may be uncompiled code in any suitable programming language, compiled code, assembly language instructions, or any other type of instructions.

The storage 810 may also store an operating system 814 for operating the electronic device 800. The storage 810 may store additional applications 816 for providing additional functionality, as well as data 818 for use by the electronic device 800 or another device.

The electronic device 800 may have a communication device 830 for communicating with a communication network 850. The communication device 830 may be, for example, a modem, an Ethernet connection, a fiber optic connection, a radio antenna, or any suitable means for communicating with a network.

The electronic device 800 may proxy a transport protocol in an access network. For example, if the network is a UMTS network, the electronic device 800 may proxy an Iu-B or an Iu-PS protocol. However, the present disclosure is not limited to implementation in a UMTS network, and may be deployed in any suitable communication network. The transport protocol employed will vary based on the type of communication network utilized.

Figure 9A:
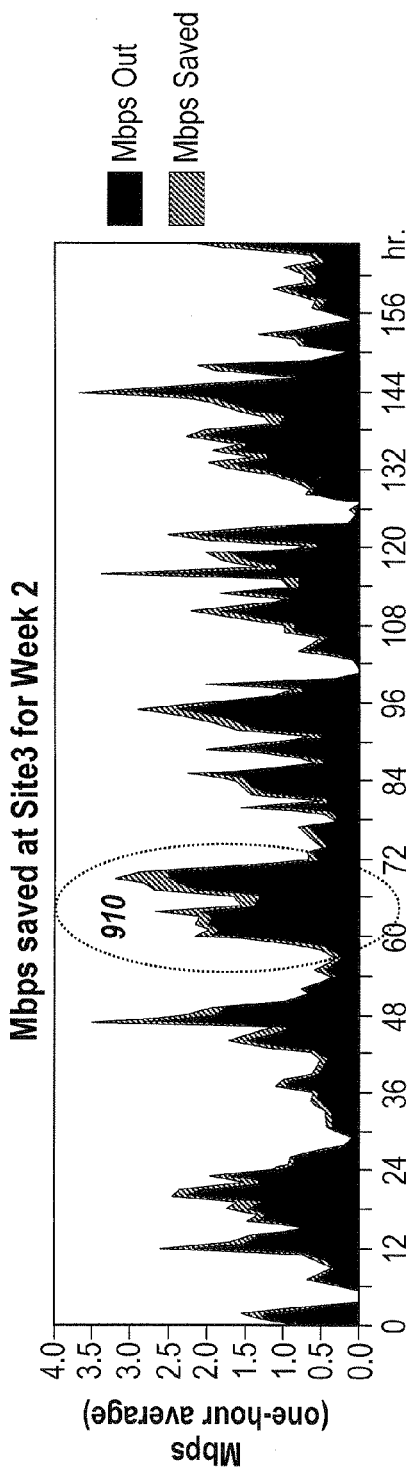
FIG. 9A is a graph depicting the number of Mbps saved over the course of a week by deploying a bypass device according to exemplary embodiments described herein.
Figure 9B:
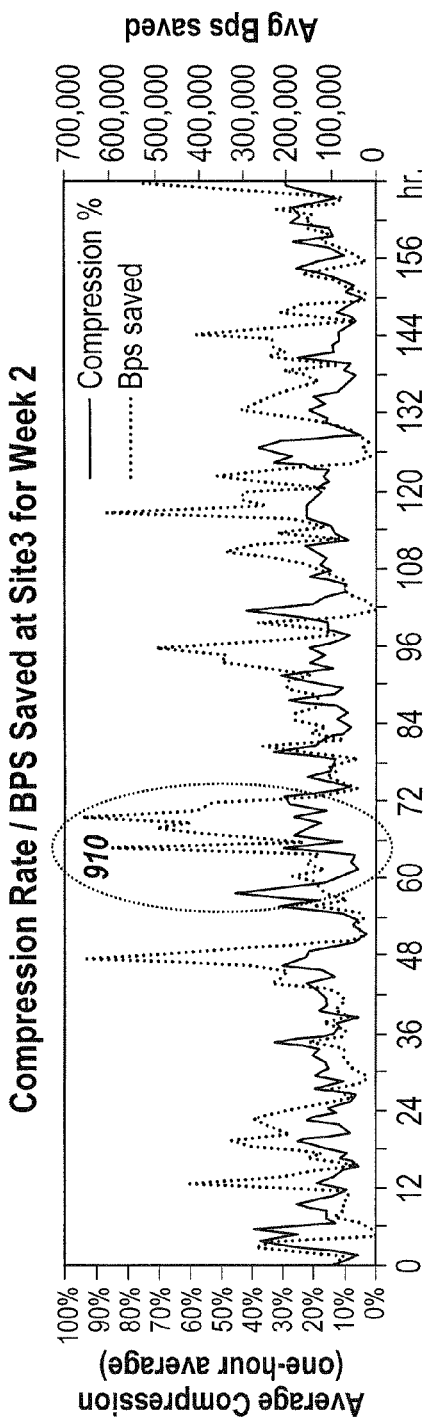
FIG. 9B is a graph comparing the compression rate of a data stream compressed by an exemplary bypass device to the number of Bps saved over the course of a week.

FIG. 9A is a graph depicting the number of Mbps saved over the course of a week by deploying a bypass device according to exemplary embodiments described herein. FIG. 9B is a graph comparing the compression rate of a data stream compressed by an exemplary bypass device to the number of Bps saved over the course of a week. The time period 910 indicates one peak period over which the backhaul utilization of the network was greatly reduced using the methods and devices described herein. Time period 910 corresponds to the same time period in FIGS. 9A and 9B. During time period 910, the present system exhibited a more than 40% compression advantage over a conventional system, saving nearly 700,000 Bps and compressing the data by over 90%.

In the tests described by FIGS. 9A and 9B, the presently described system is capable of reducing backhaul utilization in the network by over 40% during peak periods as compared to a convention access network wherein the RNC is not bypassed.

Figure 10:
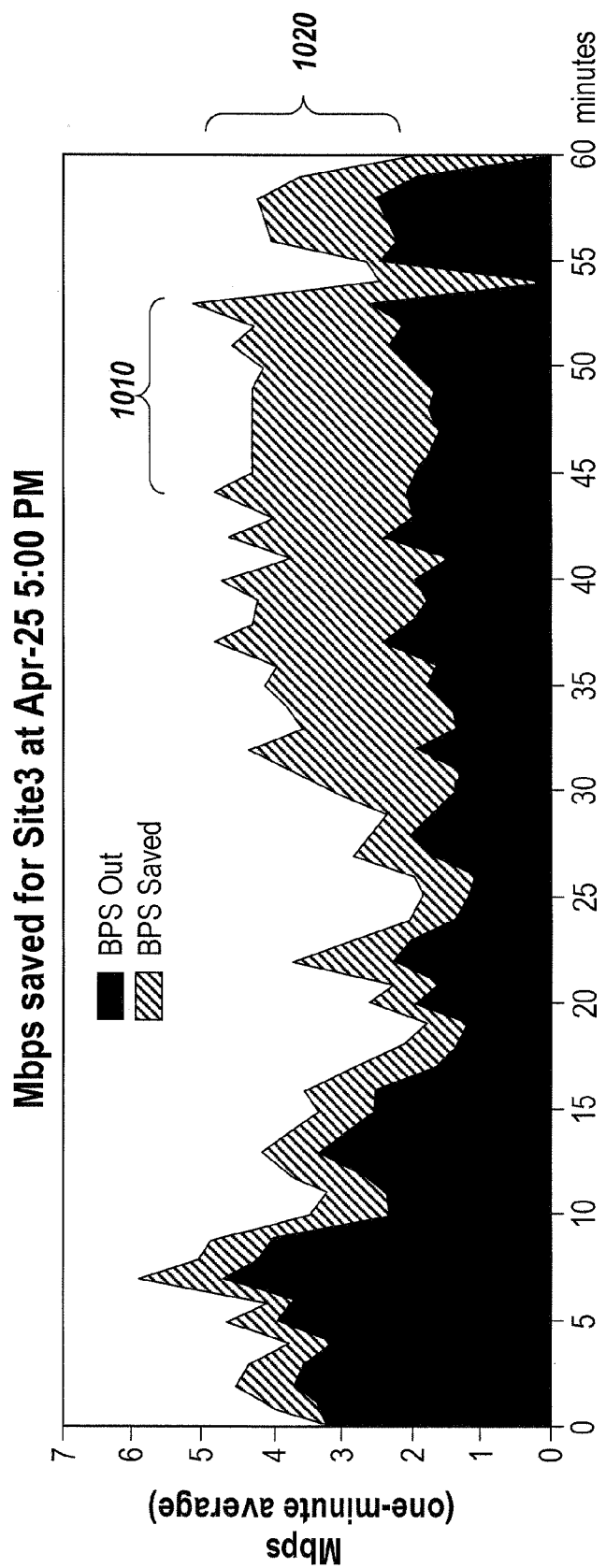
FIG. 10 depicts the number of Mbps saved over the course of an hour using an exemplary bypass device in a network during a peak usage hour.

FIG. 10 depicts the number of Mbps saved over the course of an hour using an exemplary Bypass in a network during a peak usage hour. As shown in FIG. 10, the maximum benefit is derived during periods of peak use. For example, during the peak period of use 1010, the peak savings 1020 over the course of one five-minute period in FIG. 10 were greater than 2.5 Mbps.

As demonstrated in FIGS. 9A-10, the present system effectively reduces the cost of mobile broadband service delivery without requiring expensive upgrades or changes to existing devices.

Although the above description has been given with specific examples from a mobile network, one having ordinary skill in the art will recognize that the present invention is not so limited, and may be applied in any type of network.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the invention, and exclusive use of all modifications that come within the scope of the appended claims is reserved. It is intended that the present invention be limited only to the extent required by the appended claims and the applicable rules of law.

The invention claimed is:

1. A method performed an electronic device in a communication network having an access network that is a Universal Mobile Telecommunications System (UMTS) access network, the method bypassing a radio network controller that receives and transmits a data stream in a communication network, the data stream comprising a first data channel and a second data channel, the method comprising:
    receiving at least the second data channel at a location upstream of the radio network controller in the UMTS access network such that the second data channel is not provided to the radio network controller, the second data channel comprising data in a format that is compatible with the radio network controller;
    processing, using at least one of the electronic devices, the second data channel to create a bypass data channel, the bypass data channel comprising data in a bypass format; and
    forwarding the bypass data channel to a location downstream of the radio network controller in the UMTS access network.

2. The method of claim 1, wherein processing the second data channel comprises ciphering the second data channel.

3. The method of claim 1, wherein processing the second data channel comprises compressing the second data channel.

4. The method of claim 1, wherein the bypass device emulates an RNC protocol stack.

5. The method of claim 1, wherein the location upstream of the radio network controller in the UMTS access network is provided on an IuPS interface, and the location downstream of the radio network controller in the UMTS access network is provided on an IuB interface.

6. An electronic device readable storage medium storing executable instructions for performing a method in an electronic device in a communication network having an access network that is a Universal Mobile Telecommunications System (UMTS) access network, the method bypassing a radio network controller that receives and transmits a data stream in a communication network, the data stream comprising a first data channel and a second data channel, the instructions executable by one or more processors to cause the one or more processors to:
    receive the first data channel and the second data channel at a location upstream of the radio network controller in the UMTS access network, the second data channel comprising data in a format that is compatible with the radio network controller;
    select data in the first data channel and provide the data in the first data channel to the radio network controller;
    process the second data channel to create a bypass data channel, the bypass data channel comprising data in a bypass format; and
    forward the bypass data channel to a location downstream of the radio network controller in the UMTS access network.

7. The method of claim 6, wherein processing the second data channel comprises ciphering the second data channel.

8. The method of claim 6, wherein processing the second data channel comprises compressing the second data channel.

9. The method of claim 6, wherein the bypass device emulates an RNC protocol stack to place the data in the bypass format.

10. The method of claim 6, wherein the location upstream of the radio network controller in the UMTS access network is provided on an IuPS interface, and the location downstream of the radio network controller in the UMTS access network is provided on an IuB interface.

11. A system for use in a communication network having a Universal Mobile Telecommunications System (UMTS) access network, the system bypassing a radio network controller that receives and transmits a data stream in the UMTS access network, the data stream comprising a first data channel and a second data channel, the system comprising:
    a bypass device, the bypass device comprising
        a storage for storing instructions and data; and
        one or more processors for executing instructions, the instructions causing the one or more processors to:
            intercept at least the second data channel at a location upstream of the radio network controller in the access network such that the second data channel is not provided to the radio network controller, the second data channel comprising data in a format that is compatible with the radio network controller, process the second data channel to create a bypass data channel, the bypass data channel comprising data in a bypass format, and forward the bypass data channel to a location downstream of the radio network controller in the UMTS access network.

12. The system of claim 11, further comprising a remote node located at the location downstream of the radio network controller in the UMTS access network, the remote node comprising:

a storage for storing instructions and data; and one or more processors for executing instructions, the instructions causing the one or more processors to:

receive the bypass data channel at the location downstream of radio network controller and processing the bypassed data channel to create data in a format that is compatible with a base station in the UMTS access network, and forward the data in the format that is compatible with the base station towards the base station.

13. The system of claim 11, wherein processing the second data channel comprises one of the group of ciphering the second data channel and compressing the second data channel.

14. The system of claim 11, wherein the bypass device emulates an RNC protocol stack to place the data in the bypass format.

15. The system of claim 11, wherein, the location upstream of the radio network controller in the UMTS access network is provided on an IuPS interface, and the location downstream of the intermediate service platform in the access network is provided on an IuB interface.

* * * * *